Patented Feb. 14, 1950

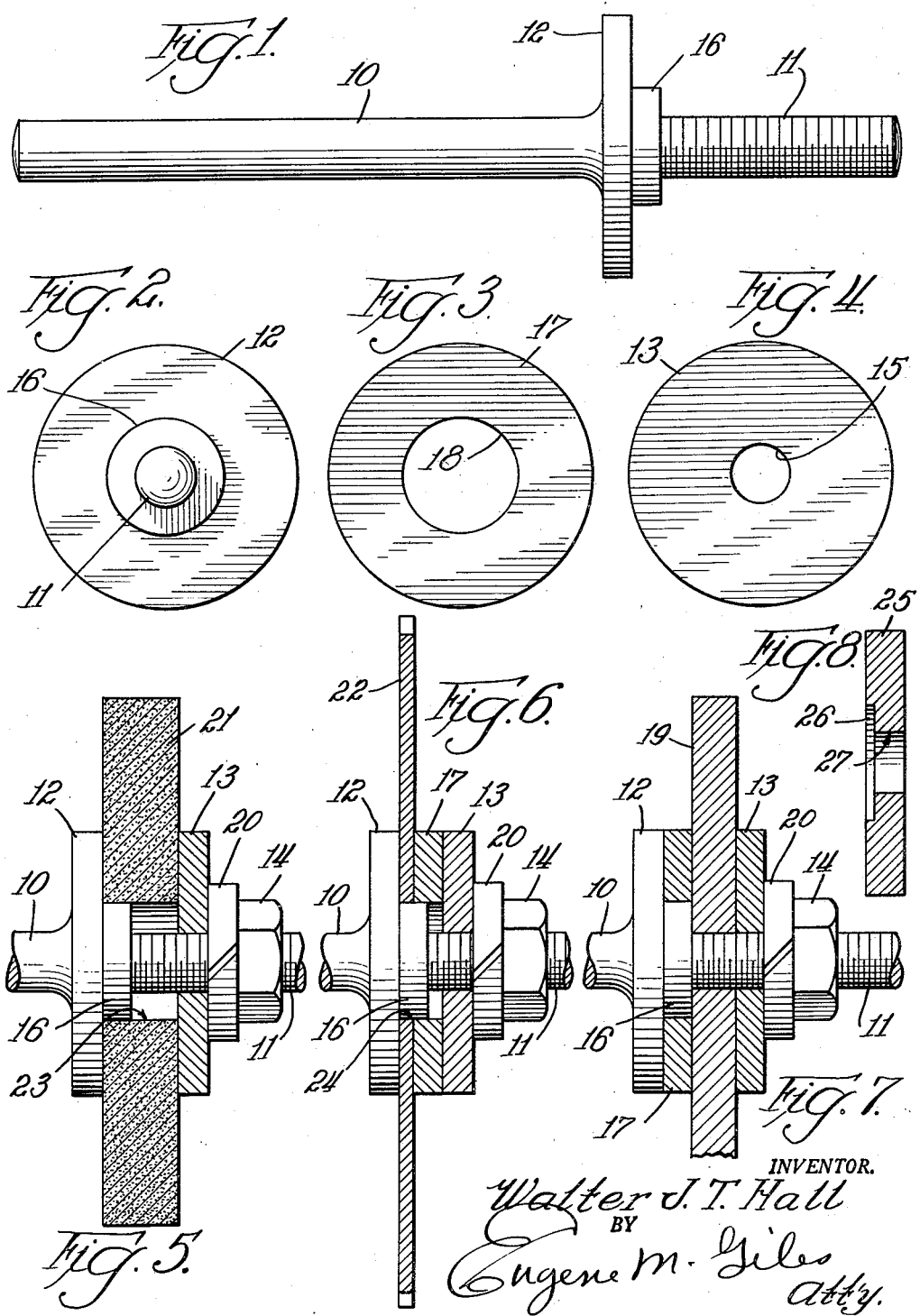

2,497,217

UNITED STATES PATENT OFFICE 2,497,217

HOLDER FOR ROTARY TOOLS WITH CENTER HOLES OF DIFFERENT SIZES

Walter J. T. Hall, Benton Harbor, Mich.

Application March 8, 1947, Serial No. 733,386

4 Claims. (Cl. 51—168)

My invention relates to a shaft or spindle for holding rotary tool attachments, such as grinding wheels, saws, milling cutters, wire brushes, buffing wheels and the like, and has reference more particularly to facilities whereby the shaft or spindle is adapted to accommodate such attachments with center holes of different sizes.

Attachments of the character above mentioned, which are commonly used with power operated devices, such as high speed drills, have center holes by which they are attachable in centered position on the spindle or shaft by which they are operated.

Such attachments, however, are made with center holes of different sizes to fit on shafts or spindles of the different sizes with which the power operated devices or high speed drills on which they are usable are equipped or adapted to accommodate, and it oftentimes happens that such attachments are available with center holes of a size which will not fit on the shaft or spindle of the particular power operated device which is available for use.

Accordingly, it is desirable to provide such power operated devices with a shaft or spindle which is adapted to accommodate such attachments with center holes of several different sizes.

The principal objects of my invention are to provide a mounting for rotary tool attachments of the type above mentioned which is adapted to accommodate attachments with center holes of several different sizes; to construct the mounting in a form for detachable application in the chuck of a high speed drill or the like; to construct the facilities which accommodate center holes of different sizes as a unitary part of the shaft or spindle of the holder; and in general to provide a simple and convenient holder of this character by which rotary tool attachments of the type above-mentioned are accurately and securely held in properly centered position, these and other objects being accomplished as pointed out more fully hereinafter and as shown in the accompanying drawing in which:

Fig. 1 is a side view of the spindle or shaft portion of a tool attachment holder constructed in accordance with my invention;

Fig. 2 is a view looking at the right-hand end of the spindle of Fig. 1;

Figs. 3 and 4 are plan views of the clamping plates employed with the shaft or spindle of Fig. 1;

Fig. 5 is a side view of a portion of the mounting end of my holder, with parts in section, showing the application of a wide face grinder wheel with large size center hole on the mounting;

Fig. 6 is a view similar to Fig. 5 but showing a thin attachment such as a circular saw, mounted on the holder;

Fig. 7 is a view similar to Fig. 5 but showing a wheel with small center hole mounted on my attachment; and Fig. 8 is a diametrical sectional view of a modification of the clamping plate of Fig. 3.

Attachments of the type for which the present invention is designed, namely, grinding wheels, circular saws, milling cutters, wire brushes, buffing wheels and the like, are used very extensively with high speed drills and the like which have a chuck in which a tool is detachably secured for operation by the drill, and my invention is illustrated in a form adapted for detachable application in such chucks although not necessarily limited thereto.

As shown on the drawing, the holder comprises a spindle or stem, illustrated as a whole in Fig. 1, having a plain relatively long portion 10 at one end, which is adapted to be engaged in the chuck of a high speed drill or the like, and having at the other end a relatively short threaded portion 11 upon which a grinding wheel, circular saw or other attachment or tool is secured for operation by the high speed drill, said spindle or stem being formed between the portions 10 and 11 with a circular disk portion 12 serving as a fixed clamping plate against which the grinding wheel, circular saw or the like is clamped on the threaded portion 11 by a slidable washer-like clamping plate 13 and a nut 14 which has a threaded engagement with the portion 11 of the spindle or stem. This clamping plate 13 has a central hole 15 of such size that it fits closely on but is free to slide on the threaded stem 11.

Grinding wheels, circular saws and similar attachments which are generally used with high speed drills usually have center openings of either one-quarter inch or of one-half inch diameter, and the threaded stem portion 11 is made of a diameter to accommodate the smaller size center opening of attachments to be used thereon, for example, of one-quarter inch diameter when the holder is designed for use with the usual high speed drill.

Moreover, the stem portion 10 of holders designed for such use is also preferably of one-quarter inch diameter, as this is a size of stem which will be readily accommodated in the chucks of most high speed drills with which attachments of the character contemplated herein are generally used.

To adapt such holder to accommodate grinding wheels, circular saws and similar attachments having center openings of larger size than the threaded stem portion 11, for example, with center openings of one-half inch diameter, the face plate 12 is of stepped form having at the threaded stem side a circular offset or extension 16 concentric with the axis of the stem portion 11 and of one-half inch diameter and preferably of sufficient width, for example, one-eighth inch width, to afford substantial engagement in the opening of a grinding wheel or the like that is mounted thereon.

Moreover, for cooperation with this shoulder portion or step 16 a clamping ring 17 is also provided with center opening 18 of the same diameter as the shoulder 16 so as to fit freely but accurately thereon, and this ring 17 which is preferably of the same size as the clamping plate 12 is of the same thickness as the width of the shoulder 16 so that when said ring 17 is located on the shoulder 16 the outer face of said ring 17 is flush with the outer face of the shoulder portion 16.

In using the above described holder for attachments having center holes of the same size as the threaded stem 11, the clamping ring 17 is first placed in position on the shoulder 16 as shown in Fig. 7 after which the attachment, indicated at 19 in said figure is slipped on the stem portion 11 with the washer 13 applied on the stem portion 11 at the outer side of the attachment and the parts clamped together by threading the nut 14 onto the threaded stem 11, a lock nut 20 being preferably interposed between the nut 14 and the clamping plate 13. Thus, the attachment is clamped firmly in place against the outer faces of the shoulder 16 and the clamp plate 17 thereon.

When, however, attachments, such as shown at 21 in Fig. 5 or at 22 in Fig. 6, are employed having half inch center holes as indicated at 23 and 24 respectively, the clamping ring 17 is removed from the shoulder 16 and the attachment is mounted directly on the half inch diameter shoulder 16, which thus centers the attachment on the holder, and it is clamped in place therein.

If the attachment is a grinding wheel or other attachment, such as shown at 21 in Fig. 5, having a thickness greater than the width of the shoulder 16, then the clamping ring 17 is not employed but the clamping plate 13 is merely secured directly against the outer side of the attachment 21 by the clamping nut 14 and lock washer 20 as shown in Fig. 5.

If, however, an attachment of a thickness less than the width of the shoulder 16 is employed, as for example the circular saw 22 of Fig. 6, then the clamping ring 17 is first inserted in place on the shoulder 16 against the outer face of the attachment 22, and the clamping plate 13 is then applied on the stem 11 and clamped, by the nut 14 and lock washer 20 against the outer face of the clamping ring 17 as shown in Fig. 6.

Thus, the holder above described is adapted to accommodate grinding wheels, circular saws, and other attachments having either of two different sizes of center holes and irrespective of the thickness of such attachments.

If an attachment with one-half inch center hole to be mounted on the holder is of the same thickness as the width of the shoulder 16 and the clamping plate 13 will not draw up sufficiently tightly thereagainst to hold it securely against turning on the holder, then the clamping ring 17 may be employed, care being taken, however, to hold the clamping ring 17 accurately concentric with the clamping plate 13 in tightening the nut 14 so that the holder and attachment will not be off balance.

For such close fitting cases, however, the clamping plate 13 may be made, if desired, as shown at 25 in Fig. 8 with a slight circular recess 26 of shallow depth, for example, one-sixteenth of an inch in the case of a holder of the particular size above indicated, this recess 26 being concentric with the center hole 27 and of suitable diameter to receive therein the outer end of the shoulder 16.

Thus, when an attachment with half inch center hole is employed and of a thickness the same as or a trifle less than the width of the shoulder 16, the clamping plate 25 will telescope on the outer end of the shoulder 16 sufficiently to insure a tight clamping of the attachment between the clamping plates 12 and 25.

While I have shown and described my invention in a preferred form, I am aware that modifications can be made therein without departing from the spirit of the invention, the scope of which is to be determined by the appended claims.

What is claimed is:

1. A tool holder of the class described, comprising a spindle having at one end thereof and integral therewith, a two place mounting for optional attachment thereto of disk type tools with large or small center holes, said two place mounting comprising a stepped face plate having a threaded stem of the small center hole size projecting centrally from the stepped side of the face plate at the opposite side thereof from and in axial alignment with the spindle, said face plate having a projecting portion thereof forming an annular step of the large center hole size and having the threaded stem projecting therebeyond at the center thereof, a clamping plate of a thickness at least as great as the width of said annular step and having a center hole which fits on the annular step, another clamping plate of a diameter greater than that of the annular step and having a center hole which fits on the threaded stem, and threaded means on said threaded stem and by which said clamping plates are secured respectively on the annular shoulder and on the threaded stem.

2. A tool holder of the class described, comprising a spindle having at one end thereof and integral therewith, a two place mounting for optional attachment thereto of disk type tools with large or small center holes, said two place mounting comprising a stepped face plate having a threaded stem of the small center hole size projecting centrally from the stepped side of the face plate at the opposite side thereof from and in axial alignment with the spindle, said face plate having a projecting portion thereof forming an annular step of the large center hole size and having the threaded stem projecting therebeyond at the center thereof, a clamping plate of the same thickness as the width of said annular step and having a center hole which fits on the annular step, another clamping plate of a diameter greater than that of the annular step and having a center hole which fits on the threaded stem and threaded means on the threaded stem and by which said clamping plates are secured respectively on the annular shoulder and on the threaded stem.

3. A tool holder of the class described, comprising a spindle having at one end thereof and integral therewith, a two place mounting for optional attachment thereto of disk type tools with large or small center holes, said two place mounting comprising a stepped face plate having a threaded stem of the small center hole size projecting centrally from the stepped side of the face plate at the opposite side thereof from and in axial alignment with the spindle, said face plate having a projecting portion thereof forming an annular step of the large center hole size and having the threaded stem projecting therebeyond at the center thereof, a clamping plate of a thickness at least as great as the width of said annular step and having a center hole which fits on the annular step, another clamping plate of a diameter greater than that of the annular step and having a center hole which fits on the threaded stem, and a nut on said threaded stem and by which said clamping plates are secured respectively on the annular shoulder and on the threaded stem.

4. A tool holder of the class described, comprising a spindle having at one end thereof and integral therewith, a two place mounting for optional attachment thereto of disk type tools with large or small center holes, said two place mounting comprising a stepped face plate having a threaded stem of the small center hole size projecting centrally from the stepped side of the face plate at the opposite side thereof from and in axial alignment with the spindle, said face plate having a projecting portion thereof forming an annular step of the large center hole size and having the threaded stem projecting therebeyond at the center thereof, a clamping plate of a thickness at least as great as the width of said annular step and having a center hole which fits on the annular step, another clamping plate of a diameter greater than that of the annular step and having a center hole which fits on the threaded stem, threaded means threaded on said stem and securing said clamping plates respectively on the annular shoulder and on the threaded stem, and a center holed tool on the two place mounting and clamped between the face plate and the second mentioned clamping plate.

WALTER J. T. HALL.

REFERENCES CITED

The following references are of record in the file of this patent:

UNITED STATES PATENTS

| Number | Name | Date |
| --- | --- | --- |
| 149,929 | Henry | Apr. 21, 1874 |
| 809,254 | Golden | Jan. 2, 1906 |
| 1,076,022 | Conner | Oct. 21, 1913 |
| 1,159,108 | Schwartz | Nov. 2, 1915 |
| 1,302,907 | Gabus | May 6, 1919 |
| 1,364,675 | Almfelt | Jan. 4, 1921 |
| 1,493,383 | Quigley | May 6, 1924 |

FOREIGN PATENTS

| Number | Country | Date |
| --- | --- | --- |
| 622,303 | Germany | Nov. 7, 1935 |